May 2, 1939.   L. R. MORGAN   2,156,655
SPRAY
Filed June 22, 1936
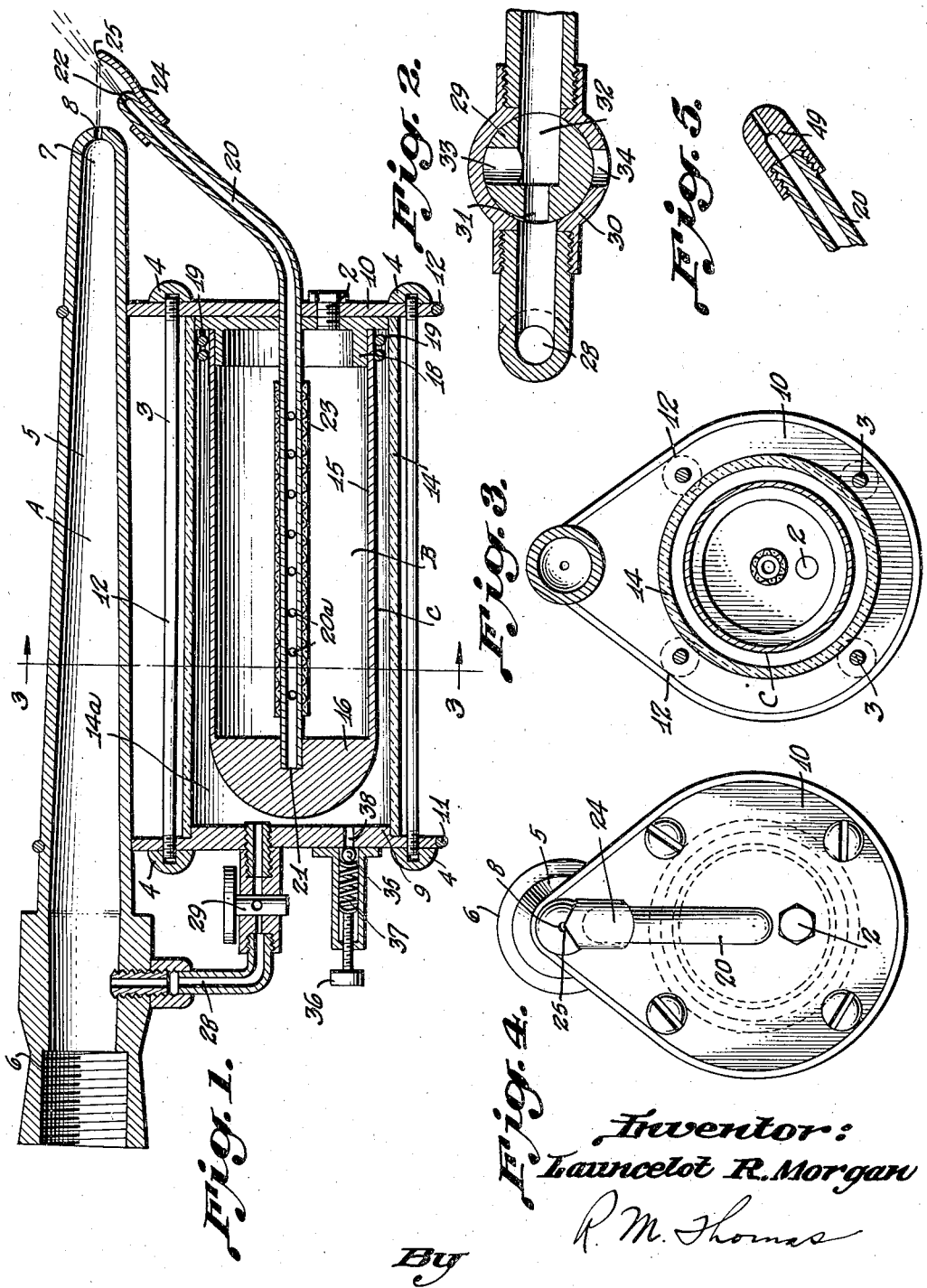
Inventor:
Launcelot R. Morgan
By R. M. Thomas
Attorney Patented May 2, 1939

2,156,655

UNITED STATES PATENT OFFICE 2,156,655

SPRAY

Launcelot R. Morgan, Tucson, Ariz.

Application June 22, 1936, Serial No. 86,497

3 Claims. (Cl. 299—85)

My invention relates to insecticide sprays which are attached to the ordinary garden hose and which spray mixes the insecticide with the proper amount of water at the same time that it is sprayed on the plants being treated.

A further object is to provide an insecticide spray which will be efficient in operation, simple in construction, and which will eliminate the need of air pressure, for spraying gardens, small plants, or trees.

A still further object is to provide a garden hose attachment which may be used to mix and spray any water soluble material such as white wash, calcimine, and other like articles and which it is desired to spray in a fine spray over a given area.

These objects I accomplish with the device illustrated in the accompanying drawing in which similar letters of reference indicate like parts throughout the several views and as described in the specification forming a part of this application and pointed out in the appended claims.

In the drawing

Figure 1 is a longitudinal diametrical section of the entire device.

Figure 2 is a section of the valve showing how it is made for shutting off the flow of fluid into the container.

Figure 3 is a section on line 3—3 of Figure 1.

Figure 4 is an end view of Figure 1.

Figure 5 is a section of one end of the insecticide tube with a removable jet shown thereon.

In the drawing I have shown the insecticide spray as A, having a tapered nozzle 5 with the large end internally threaded at 6 to fit onto the end of a garden hose. The nozzle is then tapered to the end 7 where a fine hole 8 is the jet for spraying the water out of the hose nozzle. The insecticide distributing forcing compartment is shown as B and consists of two ends 9 and 10 held in place on the nozzle 5 by wires 11 and 12. Between the two ends there is a cylinder 14 and within this cylinder I mount the flexible insecticide chamber C.

This chamber C is made in the form of a cylinder 15 having the end 16 formed into a solid semi-sphere and the other open end fitted to and held on a flange 18 of the head or end 10 of the device. Two wire clamps 19 hold the end of the bag or chamber C in place on the flange. The cylinder 14 is preferably made of glass so that the user may look through the glass and see how much the cylinder chamber C has been collapsed and how much insecticide remains. Medially through the cylinder 14 and the chamber C I provide a discharge nozzle or tube 20 which tube leads entirely through the cylinder C with the end of the tube carried in a socket 21 in the semi-spherical end 16 of the chamber C. The outer end of the tube extends out and is curved upward to near the discharge end of the nozzle 5. This tube is closed on the end with a small discharge nozzle hole 22 through which the insecticide is forced. A plate 24 is mounted onto the tube 20 near the end thereof and the end of the plate is formed to provide a spraying or distributing spray point 25 directly where the discharge nozzle spray and the hose spray intercept so that as the liquid from the insecticide chamber meets the water from the hose, they are simultaneously mixed and sprayed into a fine diverging spray or evenly mixed liquids. The nozzle hole 22 and the hole 8 are set to intercept each other as they meet on the top of the spray plate.

Surrounding the tube 20 in the chamber C there is a fabric cylinder 23 for evenly distributing the liquid into the tube and to prevent too fast feeding of the insecticide and clogging of the spray tube 20. Ports 20a carry the fluid into the tube 20 from the cylindrical chamber C.

The two ends 9 and 10 are held in longitudinal relation to the cylinder 14 by the spaced apart rods 3 and their corresponding nuts 4, said rods passing through each end plate 9 and 10 and the nuts are screwed onto each end thereof to hold them in fixed relation to each other. A plug 2 is provided in the end 10 to fill the tube C with insecticide.

As a means to force the insecticide from the chamber C I provide a tube 28 connected to the nozzle 5 on one end and to the interior of the chamber 14a in the cylinder 14 with a control valve 29 in the tube to control the flow of fluid into the cylinder. Thus, when water is passing through the nozzle 5 some of the pressure passes through the tube 28 and enters the cylinder 14 where it presses on the chamber C, compressing the chamber commensurate with the pressure, and forcing fluid from the nozzle of the chamber to meet that water from the nozzle 5.

The valve 29 is a two way valve with the inlet port 31 of the valve cylinder 30 from the tube 28 smaller than the discharge port 32 with a right angled discharge or relief port 33 formed in the cylinder 30 to allow for quick release of the pressure in the cylinder 14.

The valve 30 is provided with a discharge port 34 through which this fluid from the cylinder 14 is discharged when the valve is turned to direct the fluid therethrough.

A blow off ball valve 35 is provided in the end 9 of the compartment B. This is to prevent excess pressure in the cylinder 14 and is adjustable by an adjustment screw 36. A spring 37 holds the ball normally seated in the discharge port 38.

The discharge tube from the insecticide chamber may be made with a removable nozzle 49 as shown in Figure 5 to provide means to change the spray when desired for different solutions should such change be necessary.

Having thus described my invention, I desire to secure by Letters Patent and claims:

1. In an insecticide sprayer for garden hose, the combination of a tapered nozzle having a spray jet in the end thereof; a flexible insecticide chamber mounted adjacent said nozzle; a discharge tube from the chamber into alignment with the spray jet of the nozzle; a deflector plate mounted at the juncture of the two discharge jets of fluid from the spray jet of the nozzle and the discharge tube of the insecticide chamber; and means responsive to pressure in the nozzle to force the fluid from the chamber.

2. In an insecticide sprayer for use with a garden hose, the combination of a tapered nozzle having a spray jet in the end thereof; a forcing compartment mounted adjacent said nozzle; a discharge tube from said compartment, said tube having the discharge end in direct alignment with the spray jet in said nozzle; a deflector plate mounted at the juncture of the two discharge jets; a flexible insecticide chamber carried in said forcing compartment; means to introduce fluid pressure from said nozzle into said pressure chamber to force the insecticide from said flexible chamber into said discharge tube; and valve means to control said force or to relieve the pressure in the forcing chamber as required.

3. In an insecticide sprayer of the class described the combination of a tapered nozzle having a spray jet in the end thereof; a cylindrical pressure chamber mounted parallel to and adjacent said nozzles; ends for said chamber; longitudinal bolts mounted parallel to said chamber cylinder to hold the chamber cylinder between the ends to form a sealed chamber therein; a flexible insecticide chamber carried within said cylinder secured to the end from which the discharge leads; a discharge tube leading from the end of said chamber to which said cylinder is attached said tube being bent upwardly to near the opening of said nozzle; a deflector plate mounted onto said tube with the end of said plate extending above the horizontal level of the stream from said spray jet; a plug in the end of the cylinder to which the insecticide chamber is attached to permit introduction of insecticide thereinto; a pipe connecting the interior of said tapered nozzle with cylindrical pressure chamber; and means in the end of the cylindrical pressure chamber to relieve the pressure therein.

LAUNCELOT R. MORGAN.